US012751444B2

(12) United States Patent
Zhang

(10) Patent No.: US 12,751,444 B2
(45) Date of Patent: Oct. 6, 2026

(54) DEVICE FOR BLOCKING SMALL CREATURES FROM CRAWLING

(71) Applicant: Netvue Technologies Co., Ltd., Shenzhen (CN)

(72) Inventor: Rui Zhang, Shenzhen (CN)

(73) Assignee: Netvue Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/605,064

(22) Filed: Mar. 14, 2024

(65) Prior Publication Data

US 2025/0169489 A1 May 29, 2025

(30) Foreign Application Priority Data

Nov. 27, 2023 (CN) ......................... 202323199151.8

(51) Int. Cl.
*A01M 29/30* (2011.01)

(52) U.S. Cl.
CPC .................................. *A01M 29/30* (2013.01)

(58) Field of Classification Search
CPC ...... A01M 29/30; A01M 29/00; A01M 29/34; H01B 7/18; H01B 7/1805
USPC ................................ 43/121, 1, 124; 52/101
See application file for complete search history.

(56) References Cited

U.S. PATENT DOCUMENTS 255,499 A * 3/1882 Flood et al. ......... A47C 31/007 43/109
376,839 A * 1/1888 Wilson .................... B63B 21/12 114/174
479,980 A * 8/1892 Gordon ................. A01M 29/34 43/109
499,490 A * 6/1893 Wismer ................. A01K 47/06 449/25
514,946 A * 2/1894 Long ..................... A01M 29/34 43/109
671,978 A * 4/1901 Randolph ............... B60B 33/00 16/18 CG
1,248,337 A * 11/1917 Johnson ................. A01N 27/00 220/288
1,401,540 A * 12/1921 Konig ..................... B63B 21/12 114/221 R
1,932,237 A * 10/1933 Warner ................. A01M 29/24 47/1.3
1,960,464 A * 5/1934 Thalheimer .......... A01M 1/2011 206/0.5
2,233,832 A * 3/1941 Byrd ....................... A01M 1/18 43/109
2,506,118 A * 5/1950 Taylor .................... A01K 47/06 449/2

(Continued)

*Primary Examiner* — Maria E Graber

(57) ABSTRACT

The present application provides a device for blocking small creatures from crawling, comprising a cable connecting part and an annular fending part extended from the cable connecting part. The cable connecting part is tightly fixed around the cable, the annular fending part is extended and radiates to the periphery along the radial direction of the cable from the cable connecting part. The annular fending part and the cable connecting part are enclosed together in a fending space formed around the cable, at least of a portion of the fending space is filled with materials preventing such small creatures from passing through, which also prevent them from passing along the cables to the end of the electronic device and causing safety hazards to the electronic device or people near it.

11 Claims, 4 Drawing Sheets

(56) References Cited

U.S. PATENT DOCUMENTS

| | | | | | |
|---|---|---|---|---|---|
| 2,525,234 | A * | 10/1950 | Mucke | B63B 21/12 | 114/221 R |
| 2,617,378 | A * | 11/1952 | Osol | B63B 21/12 | 114/221 R |
| 3,005,436 | A * | 10/1961 | Caldwell | B63B 21/12 | 114/221 R |
| 3,269,358 | A * | 8/1966 | Hawley | A01K 1/031 | 119/458 |
| 3,994,034 | A * | 11/1976 | Van Damme | A01K 47/06 | 449/12 |
| 4,769,943 | A * | 9/1988 | Simpson | A01M 1/20 | 43/107 |
| 4,890,416 | A * | 1/1990 | Roberts | B63B 21/12 | 114/221 R |
| 4,953,506 | A * | 9/1990 | Sanders | A01K 5/0142 | 119/61.53 |
| 5,058,312 | A * | 10/1991 | Jackson | E04B 1/72 | 43/132.1 |
| 5,881,671 | A * | 3/1999 | Riedl | A01K 5/0142 | 43/109 |
| 6,153,281 | A * | 11/2000 | Meyer | G11B 5/743 | |
| 6,378,242 | B1 * | 4/2002 | Roberts | A01M 29/34 | 43/109 |
| 6,463,878 | B1 * | 10/2002 | Moody | A01M 1/10 | 119/52.3 |
| 6,475,061 | B1 * | 11/2002 | Huang | A01K 51/00 | 449/12 |
| 6,553,726 | B1 * | 4/2003 | Roberts | A01G 13/105 | 47/32.5 |
| 6,620,025 | B2 * | 9/2003 | Scheuneman | A01K 51/00 | 449/2 |
| 6,779,311 | B2 * | 8/2004 | Roberts | A01M 1/20 | 47/32.5 |
| 6,951,182 | B2 * | 10/2005 | Onweller | B63B 21/12 | 114/221 R |
| 7,434,352 | B2 * | 10/2008 | Gouff | A01M 25/006 | 43/124 |
| 7,772,499 | B2 * | 8/2010 | Rauckman | H01B 17/00 | 361/232 |
| 7,793,461 | B2 * | 9/2010 | Klein | A01M 1/18 | 43/109 |
| 7,905,762 | B2 * | 3/2011 | Berry | A01K 47/06 | 340/573.2 |
| 8,272,921 | B2 * | 9/2012 | Sinanis | A01K 47/04 | 449/35 |
| 8,745,917 | B2 * | 6/2014 | Hui | A01M 1/103 | 43/107 |
| 9,010,888 | B2 * | 4/2015 | Kim | A47B 91/14 | 312/351.3 |
| 9,992,978 | B2 * | 6/2018 | Maher | A01N 37/04 | |
| 10,721,919 | B2 * | 7/2020 | Wilson-Rich | G08B 23/00 | |
| 11,122,781 | B2 * | 9/2021 | Williams | A01K 47/06 | |
| 11,596,142 | B2 * | 3/2023 | Hagan | E03F 3/06 | |
| 11,785,933 | B1 * | 10/2023 | Aaron | A01M 1/103 | 43/121 |
| 2003/0089048 | A1 * | 5/2003 | Rada | E01B 9/18 | 52/101 |
| 2005/0199065 | A1 * | 9/2005 | Dunegan | G01N 29/42 | 73/587 |
| 2006/0288956 | A1 * | 12/2006 | Miller | A01M 29/30 | 119/712 |
| 2009/0013938 | A1 * | 1/2009 | Miller | A01M 29/12 | 119/712 |
| 2009/0044903 | A1 * | 2/2009 | Clark | H02G 9/065 | 156/247 |
| 2011/0005807 | A1 * | 1/2011 | Chesnais | H02G 15/007 | 138/110 |
| 2011/0146133 | A1 * | 6/2011 | Bunker | A01M 1/20 | 43/132.1 |
| 2011/0154718 | A1 * | 6/2011 | Braun | A01M 29/34 | 43/132.1 |
| 2012/0124888 | A1 * | 5/2012 | Lemberg | A01M 1/14 | 43/107 |
| 2015/0033616 | A1 * | 2/2015 | Kazzaz | A01M 25/006 | 43/124 |
| 2015/0049919 | A1 * | 2/2015 | Humal | A01K 47/06 | 382/110 |
| 2015/0216159 | A1 * | 8/2015 | Vasudeva | A01M 1/103 | 43/123 |
| 2016/0050904 | A1 * | 2/2016 | Turner, Jr. | H02G 3/0418 | 49/464 |
| 2016/0198687 | A1 * | 7/2016 | Brunner | A01K 51/00 | 449/12 |
| 2016/0198692 | A1 * | 7/2016 | Simpson | A01M 23/005 | 43/132.1 |
| 2022/0132833 | A1 * | 5/2022 | Miao | A01M 29/16 | 119/719 |
| 2024/0215549 | A1 * | 7/2024 | Brod | A01K 47/06 | |

* cited by examiner

DEVICE FOR BLOCKING SMALL CREATURES FROM CRAWLING

CROSS REFERENCE

The present application claims foreign priority of Chinese Patent Application No. 202323199151.8, filed on Nov. 27, 2023, in the China National Intellectual Property Administration, the entire contents of which are hereby incorporated by reference in its entirety.

TECHNICAL FIELD

The present application relates to the technical field of electronic devices. More specifically, the present application relates to a device for blocking small creatures from crawling.

BACKGROUND

Due to the lack of effective protection measures for existing cables, the small creatures such as ants may easily climb along cables to the electronic devices; while many electronic devices are used for monitoring infants, which may cause safety problems to infants by such small creatures such as ants.

SUMMARY

The present application provides a device for intercepting small crawling creatures to reach the purpose of preventing small creatures such as ants from climbing along cables.

The present application provides a device for blocking small crawling creatures. The device comprises a cable connecting part and an annular fending part extended from the cable connecting part. The cable connecting part is used for tightly fixing around cables, the annular fending part is extended and radiates to the periphery along the radial direction of the cable from the cable connecting part, the annular fending part and the cable connecting part is enclosed together in a fending space formed around cables, at least of a portion of the fending space is filled with materials preventing such small creatures from passing through.

The annular fending part and the cable connecting part are removable for connection, the cable connecting part is set with through-holes for clamping and fixing the cable.

The annular fending part is set with a slot hole, the through-hole is extended from side wall of the cable connecting part to the center, after the cable connecting part is inserted into the slot hole, the opening of the through-holes on the side wall will be closed.

The cable connecting part is made of silicone materials, after the cable connecting part is inserted into the slot hole, the cable connecting part will be tightly matched with the periphery of the cable.

The annular fending part and the cable connecting part are integrally formed, the cable connecting part and the cable are integrally formed.

The filled material may be water or other similar liquid.

Multiple supporting elements in the fending space are also included to stabilize the filled materials and keep their positions in the enclosed space.

The fending space is set with a smooth surface along the circumferential direction at the opening, the smooth surface is used for preventing small creatures from climbing up.

An anti-skid part is set on the surface of the annular fending part against the fending space, the anti-skid part is easy to hold and operate.

The annular fending part is made of transparent materials for observing status of the filled materials.

The device in this application, compared to the traditional cable, uses the annular fending part and the cable connecting part together to enclose a fending space in which the filled materials can prevent small creatures from passing through, that is to say, preventing them from passing along the cables to the end of electronic device, in order to avoid causing safety problems by such small creatures on the electronic device or people near it.

BRIEF DESCRIPTION OF THE DRAWINGS

To more clearly describe the technical scheme in embodiments of the present application, below in conjunction with accompanying drawings the present application is further specified, upon which those skilled in the art can obtain other drawings without creative efforts.

EMBODIMENTS

Figure 1:
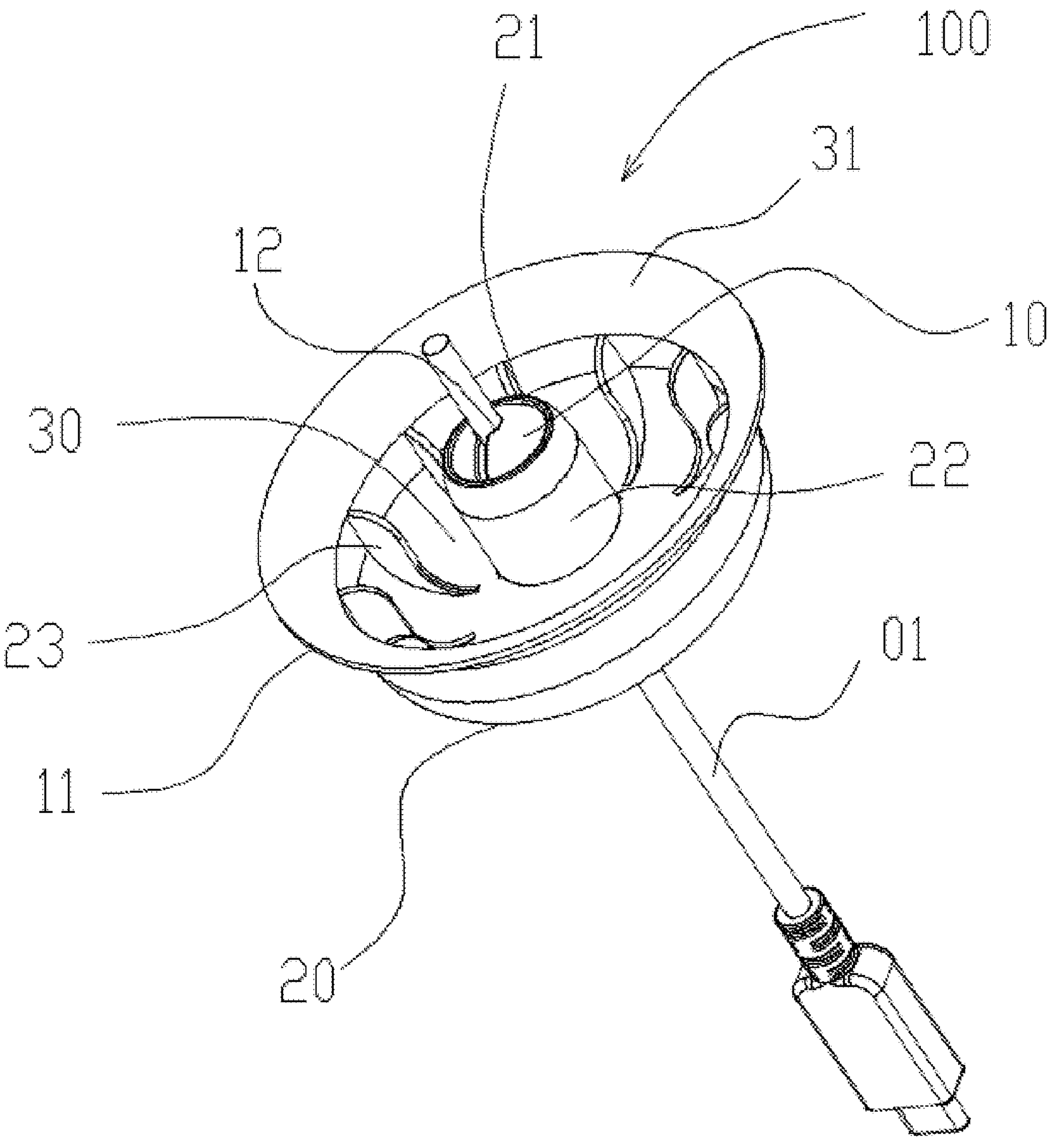
FIG. 1 is the structural diagram of the device in the embodiments of the present application.
Figure 2:
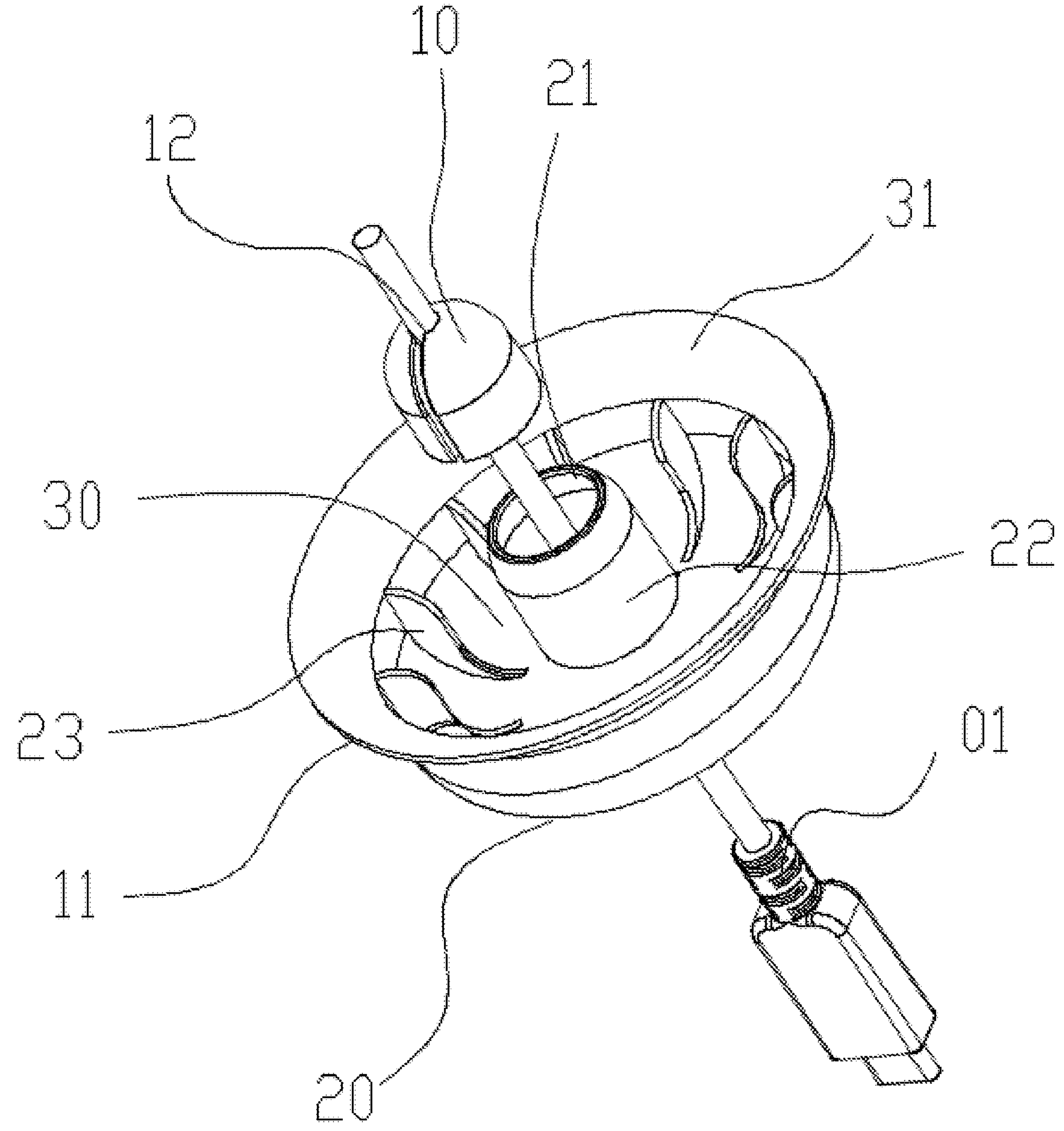
FIG. 2 is the decomposition diagram of the device in the embodiments of the present application.

Unless otherwise specified, all technical and scientific terms used herein have same meanings that are generally understood by those skilled in the art; the terms used in the Description of embodiments of the present application herein are only used for describing the purpose of specific embodiments, instead of limiting thereof; the terms "include" and "have" and their other variants in the Description of embodiments of the present application, Claims, Description of The Drawings herein above intend to be non-limiting. The terms such as "first", "second" in the Description of embodiments of the present application, Claims, Description of The Drawings herein above are used for distinguishing different objects, instead of describing specific sequence.

The "embodiments" mentioned herein mean that specific characterizes, structures or properties described in combination with embodiments can be included in at least one embodiment of the present invention. The expression appeared in different positions of the Description does not mean the same embodiment, or independent and alternative embodiments exclusive with other embodiments. Those skilled in the art explicitly or implicitly understand that all described embodiments herein can be combined with other embodiments.

To help those skilled in the art better understand the embodiments of the present invention, specific embodiments are presented as follows in conjunction with the accompanying drawings.

Refer to FIGS. 1 to 4. The present application provides a device 100 that is mainly used for preventing small creatures such as ants from climbing around cable 01, further preventing possible damage of cable circuit or short circuit, or any influence on the electronic device connected to the cable circuit, or danger to people around the electronic device, and other situations. The purpose of this invention aims to provide a simple, high-efficient and practical device 100, in order to overcome shortcomings of prior art.

According to the present application, on the one hand, it provides a device 100, as shown in the figure. The device mainly comprises two parts: cable connecting part 10 and annular fending part 20. The cable connecting part 10 is used for tightly fixing on cables. The annular fending part 20 extends outside from the cable connecting part 10 to form a fending space 30 surrounding cable 01. The fending space 30 is filled with a type of material that can prevent small creatures from passing through, for example, water and/or other similar liquid.

It is understood that, as a possible case to demonstrate and describe, it is generally similar to the use of cable 01, one end of the cable 01 is inserted into the power socket on the wall through the power adapter and the other end is inserted into an electronic device which can be a laptop, or infant monitoring instrument, or lamp and other household appliances, especially the device to be used in the infant monitoring environments. The electronic device is connected to the wall through the cable 01, so that small creatures such as ants on the wall may climb along the cable 01 to one end of the electronic device and further go into the infant monitoring environment, causing safety problems to infant or the electronic device easily. The device 100 of this application can effectively prevent small creatures such as ants from climbing along the cable 01 into living environments of users, avoiding possible safety problems.

In this embodiment, the cable connecting part 10 is used for tightly fixing around the cable 01, the annular fending part 20 is extended and radiates to the periphery along the radial direction of the cable 01 from the cable connecting part 10, the annular fending part 20 and the cable connecting part 10 are enclosed together in a fending space 30 formed around the cable 01, at least of a portion of the fending space 30 is filled with materials preventing such small creatures from passing through. The cable connecting part 10 is closely connected to the cable 01 to not only prevent small creatures from passing through the gap between the cable connecting part 10 and the cable 01, but also prevent flow of filled materials such as water from the cable connecting part 10 to the cable 01, thereby avoiding safety problems on the electronic device.

Specifically, the cable connecting part 10 is roughly columnar to increase the connection length between the cable connecting part 10 and the cable 01, thereby stabilizing the connection between the cable connecting part 10 and the cable 01. The annular fending part 20 is set with annular housing 11 located around the cable connecting part 10, where the annular housing 11 is roughly bowl shaped. The fending space 30 is formed in the annular housing 11. The bowl opening of the annular housing 11 faces towards one end of connection power of the cable 01, and generally faces upwards vertically to effectively fill the annular housing 11 with materials such as water. As a case, when the device 100 is used, one end of connection power of the cable 01 needs to be located at higher position than the other end, so that the opening can face upwards vertically under the gravity of the device 100, in order to prevent water overflow from the annular housing 11.

Further, the annular fending part 20 and the cable connecting part 10 are removable for connection together, the cable connecting part 10 and the cable are removable for connection together. In this case, the cable connecting part 10 is set with a through-hole 12 for clamping and fixing the cable to tightly fix the whole device on the cable. The annular fending part 20 also can be set with a slot hole 21, the cable connecting part 10 can be inserted into the slot hole 21. The through-hole 12 of the cable connecting part 10 can be extended from side wall to the center. As a result, when the cable connecting part 10 is inserted into the slot hole 21, the opening of the through-hole 12 on the side wall will be completely closed to connect the whole device more stably to the cable, this can also prevent small creatures from passing through the opening of through-hole 12 of the cable connecting part 10.

Specifically, the annular fending part 20 is also set with a plug connection column 22 connected to the center of the annular housing 11, the center of the plug connection column 22 is set with a slot hole 21. The end of the cable connecting part 10 is hemispherical, in order to insert the cable connecting part 10 into the slot hole 21.

Alternatively, the cable connecting part 10 can be made of materials such as silica gel, which makes its contact with the cable more tightly to better adapt to different cable sizes, and to prevent leakage of filled materials in the fending space 30. Similarly, the annular fending part 20 also can be made of transparent materials, in order to observe filling conditions in the fending space 30 more conveniently.

In addition, to keep filled materials in the fending space 30 constantly stable, multiple supporting elements 23 can be set in the fending space 30. These supporting elements 23 can not only maintain distribution of filled materials, but also can prevent small creatures from passing through to a certain extent.

Specifically, the supporting element 23 is a stiffener extended along the radial direction from the inner wall of the annular housing 11, the width is larger for the stiffener close to the bowl sidewall of the annular housing 11, but smaller for the stiffener close to the bowl bottom of the annular housing 11, the width of stiffeners from bottom of the annular housing 11 to the opening direction gradually increases. Multiple stiffeners are equidistantly arranged around the cable 01 to stabilize filled materials such as water in the fending space 30 and to prevent overflow of such materials from the fending space 30 due to shaking.

To further improve safety and protection effects, a smooth surface 31 can be set in the circumferential direction of the opening of the fending space 30, which can prevent small creatures from passing through the device. However, on the surface of the annular fending part 20 against the fending space 30, the anti-skid part can be set to easily hold and operate by the operator.

Specifically, the smooth surface 31 is formed at the bowl opening position of the annular housing 11, so that the opening of the annular housing 11 is horn shaped to increase opening diameter of the annular fending part 20 and to further prevent small creatures from climbing out. The setting of the back of the annular fending part 20 with the protection part can effectively hold the annular fending part 20 to assemble the annular fending part 20 and the cable connecting part 10.

Figure 3:
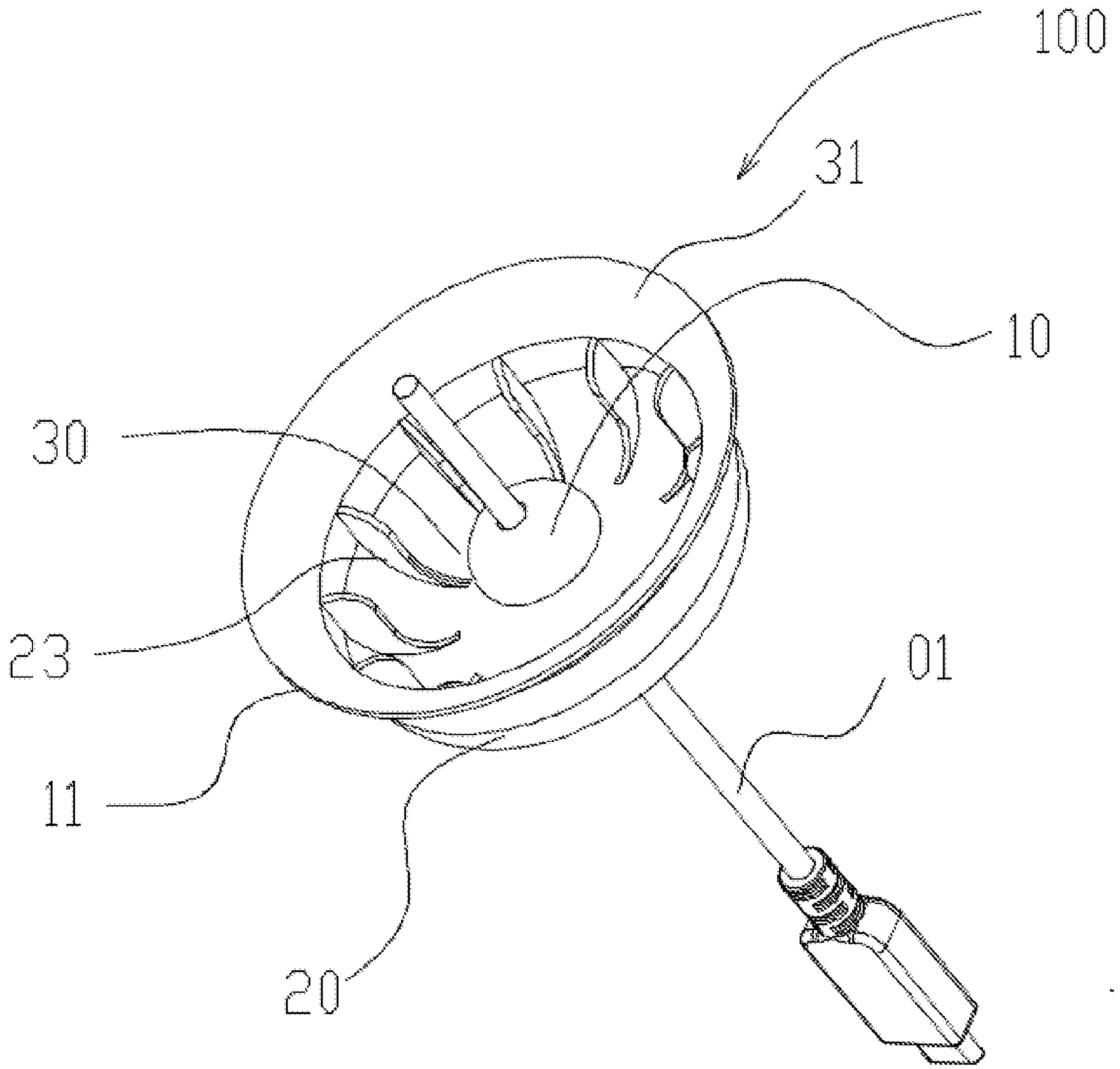
FIG. 3 is the diagram of the device in another embodiment of the present application.
Figure 4:
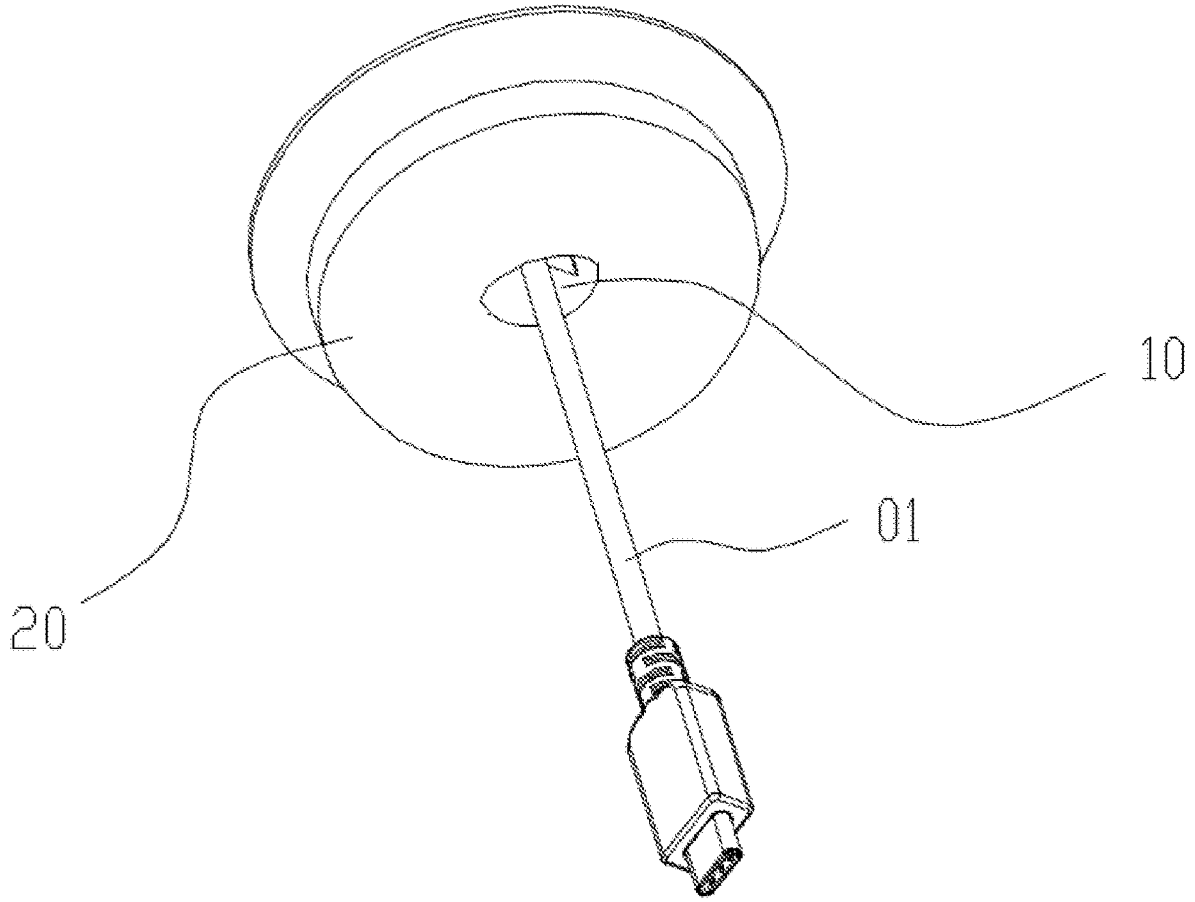
FIG. 4 is the diagram of the device in the embodiments of the present application from another view.

This application also provides another embodiment which is roughly same as the embodiment in FIG. 1, differently, as shown in FIG. 3, the removable connection of the cable connecting part 10 and the annular fending part 20 can be replaced by integrally formed cable connecting part 10 and annular fending part 20, and the cable connecting part 10 and the cable 01 are integrally formed.

Specifically, the cable connecting part 10 is hemispherical or spherical, the annular housing 11 of the annular fending part 20 is extended to the periphery from the spherical diameter position of the cable connecting part 10. During forming the cable 01, the cable connecting part 10 and the annular fending part 20 are formed on the cable 01 together. The cable connecting part 10 and the cable 01 are integrally formed, the annular fending part 20 and the cable connecting part 10 are integrally formed, so that the device 100 and the cable 01 are integrally formed, which can avoid the gap between the device 100 and the cable 01, avoid microorganism from passing through the gap, also avoid the leakage of filled materials such as water in the fending space 30, in order to ensure the safety of the electronic device connected to the cable 01, and the safety of the person or object using the electronic device.

To sum up, the device 100 of this application features simple structure, strong usability, as well as high practicability. The proper design and material selection can effectively prevent small creatures from climbing on the cables to ensure normal operation, safety and reliability of the power system.

The device 100 in this application, compared to traditional cable 01, the annular fending part 20 and cable connecting part 10 are used together to enclose a fending space 30 in which filled materials can prevent small creatures from passing through, that is to say, preventing them from passing along the cables to the end of electronic device, in order to avoid causing safety problems by such small creatures on the electronic device or people near it.

To sum up, while the application has been described in further details with reference to specific preferred embodiments thereof, the specific preferred embodiments are not intended to limit this application. Any alterations and modifications can be made by those skilled in the art, without departing from the spirit and scope thereof. Therefore, the scope of protection of this application is subject to the scope defined in claims.

The invention claimed is:

1. A device (100) for blocking small creatures from crawling, the device (100) comprising;

a cable connecting part (10) configured to surround and tightly secure to at least one cable (01);

an annular fending part (20) extending radially outward from the cable connecting part (10), the annular fending part (20) and the cable connecting part (10) together defining a fending space (30) around the least one cable (01);

a filled material disposed within the fending space (30), wherein the filled material blocks the small creatures from passing through the fending space (30); and a plurality of supporting elements (22, 23) positioned within the fending space (30), to stabilize the filled material and retain the filled material in the fending space (30); wherein the plurality of supporting elements are substantially equally spaced along a circumferential direction of the fending space;

wherein each of the plurality of supporting elements is a stiffener extending along a radial direction from an inner wall of the annular fending part towards a center of the annular fending part.

2. The device (100) of claim 1, wherein the annular fending part (20) and the cable connecting part (10) are integrally formed, and the cable connecting part (10) is integrally formed with the at least one cable (01).

3. The device (100) of claim 1, wherein the filled material is water.

4. The device (100) of claim 1, wherein the fending space (30) comprises a smooth surface (31) disposed along a circumferential direction at an opening of the fending space (30), the smooth surface (31) to impede the small creatures from climbing beyond the fending space (30).

5. The device (100) of claim 1, wherein an anti-skid part is disposed on a surface of the annular fending part (20) adjacent to the fending space (30), the anti-skid part is to provide a gripping surface for handling the device (100).

6. The device (100) of claim 1, wherein the annular fending part (20) comprises a transparent material for visual inspection of the filled material within the fending space (30).

7. The device (100) of claim 1, wherein a width of a portion, adjacent to an opening of the annular fending part, of each of the plurality of supporting elements is larger than a width of a portion, adjacent to a bottom of the annular fending part, of each of the plurality of supporting elements.

8. The device (100) of claim 1, wherein each of the plurality of supporting elements gradually widens along a direction from a bottom of the annular fending part to an opening of the annular fending part.

9. The device (100) of claim 1, wherein the annular fending part (20) and the cable connecting part (10) are removably connected, and wherein the cable connecting part (10) comprises at least one through hole (12) to clamp and fix the at least one cable (01).

10. The device (100) of claim 9, wherein the annular fending part (20) comprises a slot hole (21), and the at least one through hole (12) extends from a side wall of the cable connecting part (10), such that insertion of the cable connecting part (10) into the slot hole (21) causes, closure of an opening of the at least one through hole (12) at the side wall.

11. The device (100) of claim 10, wherein the cable connecting part (10) is made from a silicone material and is to conform tightly to an outer surface of the at least one cable (01) upon insertion into the slot hole (21).

* * * * *